United States Patent
Silvi et al.

(10) Patent No.: US 6,388,001 B1
(45) Date of Patent: May 14, 2002

(54) COMPOUNDING FILLED SILICONE COMPOSITIONS

(75) Inventors: Norberto Silvi, Clifton Park; Mark Howard Giammattei, Selkirk, both of NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/468,623

(22) Filed: Dec. 21, 1999

(51) Int. Cl.$^7$ ................................. C08K 9/06
(52) U.S. Cl. ..................... 524/588; 523/212; 523/213; 264/176.1; 264/349; 264/211.23
(58) Field of Search ................... 524/588; 523/212, 523/213; 264/176.1, 349, 211.23

(56) References Cited

U.S. PATENT DOCUMENTS

| | | |
|---|---|---|
| 3,824,208 A | 7/1974 | Link et al. |
| 4,528,324 A | 7/1985 | Chung et al. |
| 4,649,005 A | 3/1987 | Kobayashi et al. |
| 4,737,561 A | 4/1988 | Stary et al. |
| 4,898,898 A | 2/1990 | Fitzgerald et al. |
| 5,153,238 A | 10/1992 | Bilgrien et al. |
| 5,198,171 A | 3/1993 | Kasahara et al. |
| 5,338,112 A | 8/1994 | Boden et al. |
| 5,409,978 A | 4/1995 | Hamada et al. |
| 5,531,923 A | 7/1996 | LeBlanc et al. |
| 5,573,189 A | 11/1996 | Ward et al. |
| 5,599,102 A * | 2/1997 | Hamada et al. .......... 366/178.1 |
| 5,623,028 A | 4/1997 | Fitzgerald et al. |
| 5,679,726 A | 10/1997 | Gutek et al. |
| 5,910,276 A | 6/1999 | Guntherberg et al. |
| 5,925,709 A | 7/1999 | Takahashi et al. |

FOREIGN PATENT DOCUMENTS

| | | |
|---|---|---|
| EP | 622398 A1 | 4/1994 |
| EP | 570387 B1 | 12/1994 |
| EP | 902057 A2 | 3/1999 |

OTHER PUBLICATIONS

Abstract JP11216721—Manufacture of Thermoplastic Resin Composition—PAJ/JPO.

* cited by examiner

Primary Examiner—Margaret G. Moore
(74) Attorney, Agent, or Firm—Toan P. Vo; Noreen C. Johnson

(57) ABSTRACT

High levels of silica, processing fluid and high molecular weight silicone polymer are compounded into a homogeneous silica filled composition without forming a preconcentrate of fumed silica and polymer. A fumed silica is fed into a unitary continuous compounding apparatus at a first location prior to addition of the silicone polymer. The fumed silica is then compounded with the silicone polymer, which is fed into the compounding apparatus at a location downstream in the compounding apparatus from the first location. The compounding apparatus can be a co-rotating, intermeshing double screw extruder.

65 Claims, 3 Drawing Sheets

COMPOUNDING FILLED SILICONE COMPOSITIONS

BACKGROUND OF THE INVENTION

The invention relates to a process for compounding heat-vulcanizable silicone compositions.

A heat-vulcanizable silicone composition comprises a high viscosity silicone polymer, an inorganic reinforcing filler and various additives that aid processing or impart desired final properties to the composition. A vulcanizing agent can be added and the composition heat-cured to fabricate silicone rubber moldings such as gaskets, medical tubing and computer keypads.

Typically, the heat-vulcanizable silicone composition is produced by kneading a high-viscosity polydiorganosiloxane, the inorganic filler and additives by means of a batch kneading machine such as a high intensity Banbury mixer or a low intensity double arm dough mixer. In this process, polydiorganosiloxane, inorganic filler and treating agents are batch mixed until desired properties are obtained. This process requires long residence times and large amounts of energy. Non-homogeneous shear and extensional stresses across a commercial sized batch can result in non-uniform size distribution of filler that results in variations in properties. Batches processed at different times may be characterized by different physical properties. The batch process is labor, energy and capital intensive and produces materials of only marginal consistency.

Wacker-Chemie GMBH, EP 0 570 387 B1, discloses mixing, homogenizing and degassing diorganopolysiloxanes and finely divided silicon dioxide and, optionally, other components in an oscillating single-shaft pilgrim step kneader. However, while single-screw extruders can be used for melting and pressurization operations, the capability of a single-screw extruder to mix materials of different bulk densities is limited. High length-to-diameter ratio single shaft extruders are required to compound high levels of a low bulk density powder, such as fumed silica, into a high viscosity matrix, such as a diorganopolysiloxane. This is particularly so for raw, untreated fumed silica due to the difficulty in incorporating the silica into the diorganopolysiloxane. However, longer extruders require higher torque and produce higher temperatures. The higher temperatures and the dissipation of viscous heat over longer periods of time result in crosslinking and degradation of material.

In Kasahara et al., U.S. Pat. No. 5,198,171, a preconcentrate of polydiorganosiloxane, inorganic filler and treating agents is formed by a high speed mechanical shearing mixer. The resulting premix is further compounded in a same-direction double screw extruder. The premix is formed in a first step wherein a diorganopolysiloxane having a viscosity at 25° C. of $1 \times 10^5$ cP or more, an inorganic filler and a treating agent are mixed in a high-speed mechanical shearing machine to provide a flowable particulate mixture in which each ingredient is present in a substantially uniform, finely dispersed state. The flowable particulate mixture is then fed at a constant feed rate into a kneading and extruding machine that has two screws rotating in the same direction.

In Hamada et al., U.S. Pat. No. 5,409,978, a preconcentrate of polydiorganosiloxane, inorganic filler and treating agents is formed at a temperature in the range of about 200° C. to 300° C. in a co-rotating, continuous double screw extruder. The preconcentrate is then compounded and heat treated at 150° C. to 300° C. in a counter-rotating, double screw extruder.

In these processes, the fumed silica filler and silicone gum must be compounded, either batch or continuously, into a free-flowing particulate before it can be fed continuously into a compounding extruder at a reasonably high rate. Variations in feed, temperature, residence time, etc. that may be introduced up-stream in a compounding process are propagated through any down-stream step. Hence a pre-densification step causes an increase of the variability of the overall process leading, particularly in the case of batch preparation of pre-mix, to materials with inconsistent properties.

There is a need for a low cost process that continuously and consistently produces a full range of both low viscosity and high viscosity silicone elastomers from filler, additive and polymer. There is a need for a continuous, robust extrusion process that does not require a preconcentrate of filler and polymer feed to manufacture heat-vulcanizable silicone compositions. Further, there is a need for an improved single step compounding process.

SUMMARY OF THE INVENTION

The invention provides a process that compounds high levels of inorganic filler, processing fluid and silicone polymer into homogeneous filled silicone compositions with requisite reinforcing properties and levels of volatiles. The process can be conducted continuously without forming a preconcentrate of filler and polymer. The process comprises mixing a filler with a processing fluid at a first location of a unitary continuous compounding apparatus prior to addition of a silicone polymer. The filler is then mixed with the silicone polymer, which is fed into the compounding apparatus at a location down-stream from the first location.

In another aspect, the invention relates to a process for compounding silica filled silicone utilizing a co-rotating, double screw continuous compounding extruder. In the process, fumed silica is continuously fed to the co-rotating, intermeshing double screw extruder at a first location, prior to addition of a silicone polymer. The fumed silica is compounded with a processing fluid or combination of processing fluid and treating agent as the fumed silica advances to a second location. A silicone polymer is fed into the compounding apparatus at the second location and the fumed silica is compounded with the silicone polymer by means of the extruder as the fumed silica and silicone polymer advance through the extruder from the second location.

In another aspect, the invention relates to a processable silicone polymer filler composition comprising a processing fluid and a filler. The processing fluid is combined with the filler in a range of from about 0.1 to about 100 parts fluid per 100 parts by weight of filler. The invention also relates to a processable silicone polymer composition, comprising a processing fluid, a filler and a silicone polymer. The processing fluid is combined with the filler in a range of from about 0.1 to about 100 parts fluid per 100 parts by weight of filler and the filler is combined with the silicone polymer in a range of about 5 to about 200 parts filler per 100 parts by weight of polymer.

In still another aspect, the invention relates to a compounding apparatus, comprising a barrel encompassing at least one shaft with screw flights arranged in sections along the shaft according to a type of materials processing. The sections comprise (1) a first conveying section, (2) a second kneading section, and (3) a third devolatilization section.

DETAILED DESCRIPTION OF THE INVENTION

Figure 1:
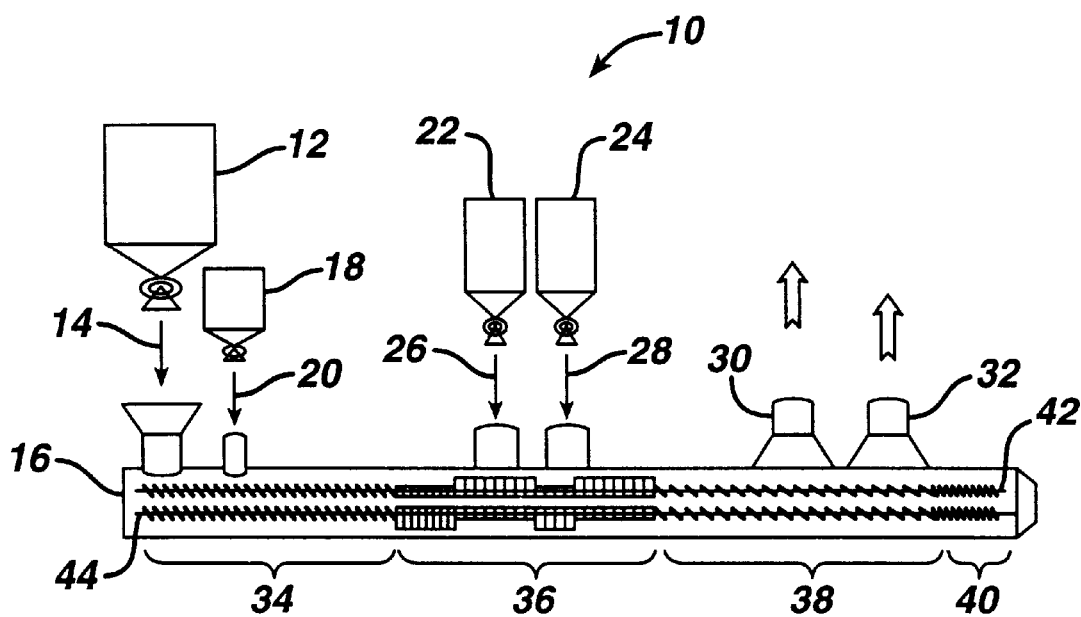
FIG. 1 is a schematic representation of a continuous silicone composition compounding apparatus for carrying out one embodiment of the invention.

In batch or continuous processes, a treating agent is dispersed along with silicone polymer either with or before the addition of filler. In these processes, the treating agent must diffuse through the bulk of the high molecular weight silicone polymer. Large interfacial forces develop between silicone polymer and free, unreacted silanol groups present in filler. The treating agent must penetrate a rigid silicone polymer/filler interface to reach reactive silanol groups. Mixing intensity must be increased to overcome the large interfacial forces to permit access of the treating agent to silanol groups. An increase in mixing intensity causes an undesirable increase in material temperature.

In one aspect, the invention relates to the order of addition of the silicone composition components. According to the invention, at least some filler is added with a processing fluid before any silicone polymer is added to provide a process with a balance between throughput and material properties. A treating agent can be added separately or as part of the processing fluid. Adding processing fluid before polymer permits easy access of treating aid to filler. Additionally, it has been found that wetting of filler by processing fluid in a first location of an extruder favors densification of the filler. The densification reduces the volume the filler occupies in the extruder. This allows for a high feed rate and throughput of filler.

The processing fluid of the invention is a fluid that can be admixed with a filler and compounded to densify a filler for further processing. The processing fluid does not include higher molecular weight silicone polymers of a molecular weight greater than 7000. The processing fluid can also provide a processing function. It can be a liquid treating agent, plasticizer, flow improving additive, cross-linking agent, water or inert blanketing gas. Preferably, the processing fluid is a liquid treating agent such as a silanol-reacting treating agent that can be added before, with or after addition of filler to wet the filler to reduce overall processing time for reaction between functional groups in the treating agent and silanols on the surface of the filler.

In one embodiment, the processing fluid is a solution prepared by mixing (in weight) 1.21 parts of a silanol-stopped polydimethylsiloxane, 1.82 parts of a vinyl-stopped dimethyl-methylvinylsiloxane and 0.12 part of a hydroxy-terminated polydimethyl-methylvinylsiloxane. A broad range of parts of silanol-stopped polydimethylsiloxane/vinyl-stopped dimethyl-methylvinylsiloxane/hydroxy-terminated polydimethyl-methylsiloxane can be 0.49/0.73/0.05 to 1.93/2.91/0.19, a desired range is 0.85/1.27/0.08 to 1.57/2.37/0.16 and a preferred range is 1.09/1.64/0.11 to 1.32/2.0/0.13.

In another embodiment, the processing fluid can be a combination of treating agent, preferably HMDZ and water. This combination can comprise a weight ratio of treating agent/water of between about 0.05 to about 50 or between about 0.1 and about 20 or between about 1 and about 6. The HMDZ can be added to the extruder either together with water or separately at the same or different locations.

The processing fluid can be combined with filler in a weight proportion of about 0.1 to about 100 parts fluid to 100 parts of filler, desirably about 0.5 to about 75 parts fluid to 100 parts of filler and preferably about 1.0 to about 50 parts fluid to 100 parts of filler. The processing fluid can be added at a single location or at a plurality of locations for step treatment of the filler.

The inorganic filler that can be used in the invention can be any inorganic filler used in blends with silicone polymers. Examples of inorganic fillers include a reinforcing silica such as fumed silica or precipitated silica or a silica that has been surface-treated with an organosilicon compound such as an organopolysiloxane, organoalkoxysilane, organochlorosilane or a hexaorganodisilazane. The filler can be diatomaceous earth, finely crushed quartz, aluminum oxide, titanium oxide, iron oxide, cerium oxide, cerium hydroxide, magnesium oxide, zinc oxide, calcium carbonate, zirconium silicate, carbon black or ultramarine. A single filler or a combination of fillers can be used to reinforce the silicone polymer.

The amount of the filler can be in the range of from about 5 to about 200 parts by weight, desirably from about 10 to about 100 parts by weight and preferably from about 20 to about 60 parts by weight, per 100 parts by weight of silicone polymer.

The concentration of residual silanol groups on the surface of a filler can govern strength of hydrogen bonds between the silica and hydroxyl or oxygen groups in the silicone polymer chain. High concentrations of residual silanols in a filler cause "structuring" or "crepe hardening" of the final product in storage. This effect leads to difficulties in the processing of the material after it has been stored for extended periods. If the concentration of silanol functional groups in a filler is too high, a treating agent can be added to reduce the groups to a required concentration. The silanol reactant treating agent can react to reduce available groups to a concentration of between about 8 to about 2 hydroxyl groups/(nanometer)$^2$ of filler, preferably between about 5 to about 3 hydroxyl groups/(nanometer)$^2$ of filler. Silica is a preferred filler in the invention, in an amount from about 10 to about 100 parts by weight, preferably from about 20 to about 60 parts by weight, per 100 parts by weight of silicone polymer.

In one embodiment, a treating agent is mixed into the filler along with the processing fluid or as the processing fluid to reduce filler silanol groups, to improve dispensability of the filler and/or to reduce the time required for aging of the silicon rubber, to prevent crepe hardening and/or to regulate plasticity. The treating agent can be the silanol-reacting reagent or another filler treating agent. The treating agent is preferably a silanol reactant treating agent when the filler is a silica or other silanol containing filler. The treating agent can be an organosilane, a low-viscosity polysiloxane or a silicone resin, which has a silanol group and/or an alkoxy group having 1 to 6 carbon atoms. Examples include diphenyl-silanediol, dimethylsilanediol, methyltriethoxysilane and phenyltrimethoxysilane. The low-viscosity polysiloxane may contain one or more kinds of organic groups selected from a methyl group, a phenyl group, a vinyl group and a 3,3,3-trifluoropropyl group. Preferred silanol-reactant treating agents include silanol-stopped polydimethylsiloxane, octamethylcyclotetrasiloxane (D4) and hexamethyldisilazane (HMDZ). While the filler can be pretreated as described, a particular advantage is that raw, untreated filler can be used in the inventive process.

The silicone polymer used in the compositions of the present invention is represented by recurring units of Formula I:

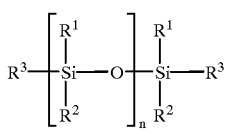

Formula I wherein $R^1$ independently at each occurrence represents $C_{1-4}$ alkyl, or $C_{2-4}$ alkenyl; $R^2$ independently at each occurrence represents $C_{1-4}$ alkyl, $C_1$–$C_4$ haloalkyl or $C_{2-4}$ alklenyl; $R^3$ independently at each occurrence is selected from the group consisting of H, $CH_2$=CH, and $OR^4$ wherein $R^4$ is selected from the group consisting of H, $CH_2$=CH, $C_{1-10}$ alkyl, $C_{2-4}$ alkenyl, $C_{4-6}$ cycloalkyl, and $C_{1-4}$ haloalkyl radical; and n represents an integer from 100 to 20,000.

A further preferred composition comprises a silicone polymer wherein $R^1$ independently at each occurrence represents $CH_3$ or $CH$=$CH_2$; $R^2$ independently at each occurrence represents, $CH_3$, $CH$=$CH_2$ or $CH_2CH_2CF_3$; $R^3$ independently at each occurrence represents $CH_3O$, $CH_2$=CH—O, OH or $CF_3CH_2CH$—O; and n represents an integer from about 4,000 to about 10,000.

Another embodiment provides a composition wherein the vinyl content of the silicone polymer ranges from about 0.05% to about 0.5% by weight of the silicone polymer.

The silicone composition can also include other additives such as heat-resistance improvers such as oxides, hydroxides and fatty acid salts of metals, vulcanization reverse inhibitors, flame retardants such as platinum compounds, discoloration preventive agents, plasticizers such as silicone oil, internal release agent such as metal soaps, pigments and dyes.

During processing, an inert blanketing gas can be added to the compounding environment to suppress oxidative reactions between a flammable processing fluid such as HMDZ, and air. The amount of inert gas can be in the range of from about 20 to about 800 parts by weight, desirably from about 50 to about 600 parts by weight and preferably from about 100 to about 400 parts by weight per 100 parts by weight of the filler.

In an embodiment of the invention, raw, untreated fumed silica filler is mixed with a processing fluid that comprises HMDZ and water at a first location prior to addition of the silicone polymer. The amount of HMDZ can be in the range of from about 0.1 to about 100 parts by weight, desirably from about 0.5 to about 50 parts by weight and preferably from about 1.0 to about 20 parts by weight, per 100 parts by weight of the fumed silica. The amount of water can be in the range of from about 0.1 to about 100 parts by weight, desirably from about 0.5 to about 20 parts by weight and preferably from about 1 to about 10 parts by weight, per 100 parts by weight of the fumed silica.

Wacher-Chemie GMBH, EP 0 570 387 B1, includes a description of a process for forming a silicone composition in an oscillating single-shaft pilgrim step extruder. Wacher-Chemie includes a comparative example in which the oscillating single-shaft pilgrim step kneader process is compared to a double screw extruder process. The compared double screw extruder has a screw diameter of 80 mm and a process zone of 20D (diameters). Housing and screw temperatures are controlled at 150° C. and the rotational speed at 40 rpm. During the comparative test (duration 3 hours), the compounding temperature was 182° to 194° C., with peaks of up to 210° C. Wear in the double screw process caused discoloration to the product as a result of friction at screw lands and along the cylinder wall. Wacher-Chemie concludes that changing intake behavior of the double screw process results in varying product characteristics over time. Pinholes indicated that a substantially longer processing zone was necessary to prepare product.

Surprisingly according to the present invention, filled silicone compositions can be advantageously compounded in a co-rotating, intermeshing double screw extruder. The process can be conducted in the co-rotating, intermeshing double screw extruder to produce heat-vulcanizable silicone compositions with high levels of filler without a prior step of forming a polymer/filler preconcentrate. Moreover, raw fumed silica—fumed silica that has not been pre treated with a treating agent—can be charged directly into the co-rotating, intermeshing double screw extruder and treated with treating agent and compounded with polymer therein.

Addition to the extruder of the individual components of the formulation, filler densification, chemical reaction between filler and treating agent, dispersion of filler into the silicone polymer to produce a homogeneous mixture and devolatilization of the homogenized material are unit operations that are performed sequentially or concurrently. According to the invention, conditions in the extruder can be controlled to carry out these operations completely in the material residence time. Hence in another embodiment, the invention relates to extrusion conditions used to compound large amounts of filler particularly fumed silica and processing fluid and treating agent and silicone polymer.

It has been found that screw design and a ratio between throughput and screw speed are parameters that control the phenomenon of surface area renewal, which is of importance in reducing the level of volatiles in a down-stream portion of the process. The process is a continuous extrusion process that does not use a preconcentrate of polymer and filler to produce silicone elastomers containing high levels of fumed silica.

Throughput and screw speed can be adjusted to allow for efficient compounding and devolatilization. Low throughput under utilizes the capacity of manufacturing equipment. On the other hand, throughput is limited by the rate at which fumed silica can be added into an extruder. High screw speeds are needed for addition and dispersion of filler and dispersion of additives into the silicone matrix and for generation of surface area for devolatilization. However, temperature rises due to viscosity and screw speed. The use of severe screw speeds can result in thermal degradation of the silicone polymer. In the invention, scalable throughput with balanced mixing intensity provides effective compounding and reaction of silicone composition components with adequate process devolatilization and heat dissipation.

In one embodiment, the invention can be defined by a total throughput to screw speed (lb/hour/rpm) ratio between about 0.01 to about 100, desirably between 0.1 and about 70 and preferably between 0.5 and 50 (lb/hour/rpm). A screw speed between about 100 rpm and about 1000 rpm can be used to provide a suitable balancing of mixing with frictional heat generation. Desirably, the screw speed is between about 200 rpm and about 800 rpm and preferably between about 280 rpm and about 450.

For a given throughput and screw design, the length of an extruder can determine residence time. Short extruders can lead to insufficient residence times for the required unit operations to take place. Longer extruders require increased torque, which is a measure of the energy needed to transport material. The increased torque requirement necessitates larger motors, consumes higher energy and results in higher costs. Additionally, longer extruders mean longer material flow paths that can generate excessive heat.

In order for an extrusion process to be scalable to higher throughput rates, barrel temperature should be controlled to differ from composition temperature by no more than 30° C. to 40° C. Suitable barrel temperature can be between about 100° C. and about 200° C., desirably between about 130° C. and about 190° C., and preferably between about 160° C. and about 180° C.

The extruder used in the invention can be a double screw extruder of the co-rotating, intermeshing type. This extruder is especially suited for the process of this invention due to its capability to produce the conditions needed for the preparation of the filler for compounding with the silicone polymer. Namely the extruder can provide high levels of compounding and mixing energy. The extruder can have multiple addition ports for on-stream addition of the components of the compounded silicones. The extruder can operate at the high temperatures and can provide the open surface areas necessary for filler chemical treatment with treating agent and for devolatilization. Finally, this extruder can provide the high pressurization necessary to pump the compounded product out of the extruder. A co-rotating, intermeshing double screw extruder is preferred due to its combination of compounding and devolatilization capability.

In an embodiment, the invention can be carried out in a combination of stages. For example, filler and processing fluid can be mixed in a first co-rotating, intermeshing stage and then further processed in another stage of different characteristics. Examples of a second stage include a counter-rotating, non-intermeshing stage, a reciprocating or non-reciprocating single screw stage or another co-rotating, intermeshing stage. For example, the first stage can be a co-rotating, intermeshing stage that densies processing fluid and filler into a homogeneous material that contains a high level of fumed silica uniformly dispersed into a highly viscous elastomeric matrix with a high content of residual volatiles. A single screw reciprocating extruder stage can be located down-stream of the densifying stage to complete filler treatment and compounding and to reduce the level of volatiles (moisture, unpolymerized monomer, solvents) contained in the predensified material to a required level. Filler, processing fluid and polymer can be added totally or partially to a first stage extruder. If only a portion of filler, processing fluid and polymer is added in the first stage, the remainder is added to the second stage.

The combination of stages can be designed for improved surface area renewal, feeding capability, residence time, mixing intensity, devolatilization efficiency, temperature control or a combination of two or more of these effects. The second extruder stage can be operated in-series with the first stage, either as an up-stream stage or down-stream stage. Compounded material can be force-fed from one extruder stage to the other by the use of pressure generated internally by the rotation of the screws.

The first co-rotating, intermeshing extruder stage can provide a high mixing intensity to initially densify and compound filler and silicone. A high rate of interfacial area generation is then provided in a devolatilizing stage of the single screw reciprocating stage to facilitate diffusion of volatile components through polymer-vapor interfaces and into the vapor space for elimination through equipment vacuum vents.

It has been found that the process of mixing a filler with a processing fluid at a first location permits silicone composition compounding to be completed in a shorter extruder apparatus. The compounding can be completed in an extruder of at least some length that is equal to or less than 42 diameters. It is a particular aspect of the invention that the compounding can be completed in an extruder of at least some length that is about 30 diameters or less in length.

The extruder can comprise a densifying stage. This stage can comprise screw elements for initially bringing processing fluid into contact with filler. This stage can be between about 3 and about 12 extruder barrel diameters in length. Desirably, this stage is between about 5 and about 10 diameters in length and preferably between about 6 and about 8 diameters in length.

A second extruder stage can comprise a reaction/compounding stage. The reaction/compounding stage can comprise kneading screw elements for dispersing and distributing filler into silicone polymer. The second stage can be between about 6 and about 18 extruder barrel diameters in length. Desirably, this stage is between about 9 and about 15 diameters in length and preferably between about 10 and about 12 diameters in length.

The extruder of the invention can be characterized by a devolatilizing third stage. The devolatilization stage can comprise bushing elements, blister rings and other pressure generating elements for sealing and pressure generation. The third stage can be between about 6 and about 18 extruder barrel diameters in length. Desirably, this stage is between about 9 and about 15 diameters in length and preferably between about 10 and about 12 diameters in length.

Devolatilization in the process of the invention is important for at least two reasons. First, devolatilization removes unreacted treating agents to "quench" further reaction with filler silanol groups. Otherwise, further treatment could diminish filler reinforcement properties in the heat-vulcanizable silicone composition. Second, devolatilization removes surplus liquids that adversely affect rheological properties of the silicone composition. Residual volatiles in the filled silicone composition should not exceed the level of about 2% by weight of the final formulation. Preferably, residual volatiles in the filled silicone composition should not exceed the level of about 1%.

The compounding apparatus of the invention is an extruder that can comprise an atmospheric vent either up-stream or down-stream of each filler addition port. The vent allows elimination of side products of the reaction between filler and treating agent and elimination of air entrained with the filler to permit feeding additional filler. The extruder also comprises at least one venting zone with a vacuum port to eliminate gaseous materials. Venting at the zone eliminates air entrained with the filler, surplus liquids in the form of vapor and added gas that is used to inert the extruder.

High temperature, low absolute pressure and stripping agents can be used for devolatilization at the venting zone. Devolatilization pressure can be controlled (in mm of Hg) between about 10 and about 300, desirably between about 20 and about 100, and preferably between about 30 and about 80. Water, $CO_2$, air, nitrogen or other inert gases, injected up-stream of the vacuum ports, reduce the partial pressure of the volatile components to increase devolatilization drive force.

Because of its low bulk density, fumed silica powder can be force-fed into the extruder using one or more side stuffers, which in turn are fed by loss-in-weight feeders. The rate at which fumed silica is delivered into the extruder depends on the design of the screws of the side stuffers and also the design of the main screws of the extruder. Deep-flighted screw elements are particularly preferred due to their increased feeding capacity. Multiple feeding points for the fumed silica allow for improved throughput rates and for improved mixing efficiency and dispersion of filler into the polymeric matrix. The filler can be quickly and fully incorporated into the cavities of an empty extruder. Hence, feeding the filler up-stream prior to the addition of processing fluid or polymer permits the filler to be fed at a higher rate. An atmospheric vent up-stream or down-stream of the fumed silica feeding port allows for elimination of air entrained with the fumed silica. When a down-stream atmospheric vent is used, the filler feeding port and the atmospheric vent can be separated by at least about 10 extruder diameters, desirably by at least about 15 and preferably by at least about 18 diameters. Otherwise filler may flow through the vent and out of the extruder before it has been entirely incorporated into the silicone polymer.

A particular advantage of the invention is that silicone polymer compositions can be compounded in a single extruder in a reduced period of time. Characteristic residence times for the single extruder process of the invention can be less than 90 seconds or less than 50 seconds or even about 30 seconds. The compositions produced by the process of the invention meet physical property standards for heat-vulcanizable silicone compositions. For example, the compositions can be characterized by a Williams Plasticity of at least greater than 100, Shore A hardness of at least greater than 20, tensile strength of at least greater than 750 psi, elongation at break of at least 100%, Tear B of at least 10 ppi, Specific Gravity of at least 1.05 and residual volatiles below 1 weight percent.

These and other features will become apparent from the following drawings and detailed discussion, which by way of example without limitation describe embodiments of the present invention.

Figure 2:
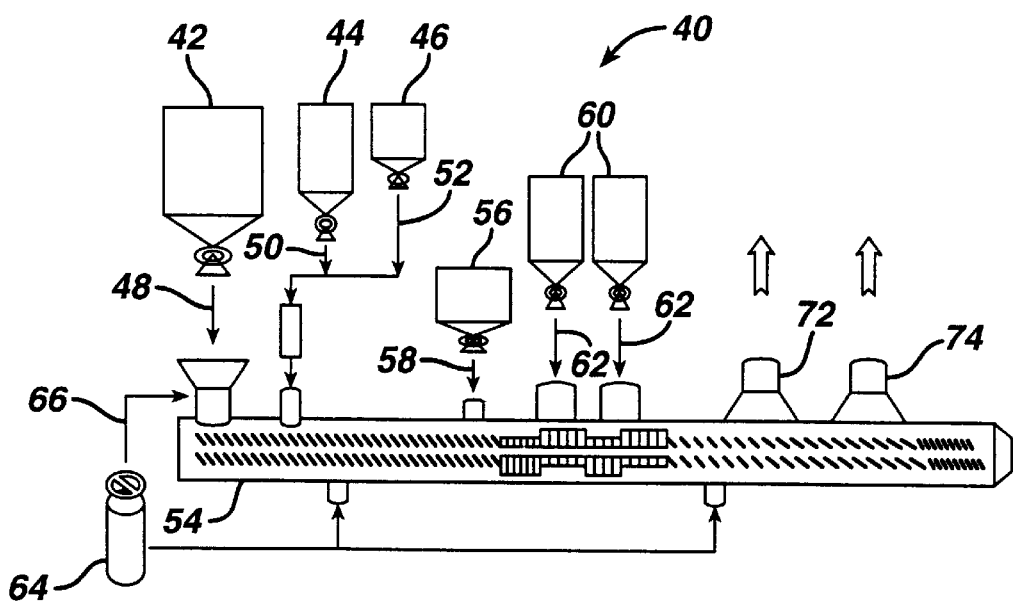
FIG. 2 is a schematic representation of a compounding apparatus for another embodiment of the invention.
Figure 3:
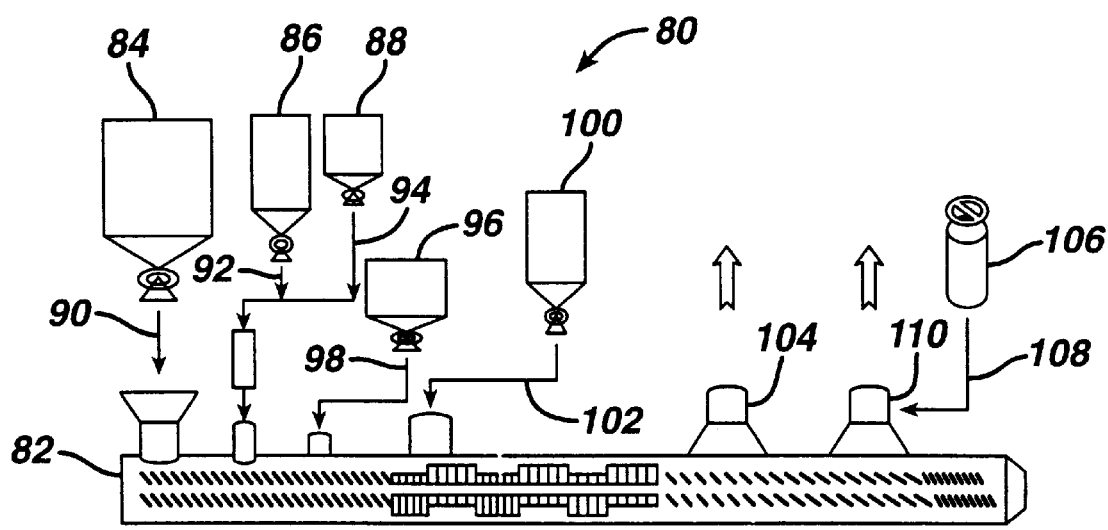
FIG. 3 is a schematic representation of a compounding apparatus for another embodiment.

In the drawings, FIGS. 1–3 are schematic representations of continuous silicone rubber extrusion apparatus and processes for carrying out embodiments of the invention. The extruders illustrated in FIGS. 1–3 were assembled by connecting segmented modules, or "barrels," with threaded rods. Each extruder had 30 mm inside diameter barrels and each barrel was 3-extruder diameters long (90 mm). In the following discussion, barrel location is identified in terms of number of barrels from the extruder feed throat with the feed throat barrel identified as barrel 1. In each example, weight-loss analysis was used to determine amount of volatiles that remained in the material after extrusion. In the Examples, the Tables 1 to 5 show operating conditions and materials and product properties for the runs. Weight percent of fumed silica indicated (*) was approximated from specific gravity values.

EXAMPLE 1

FIG. 1 illustrates an apparatus and process 10 of the invention. In FIG. 1, D4 treated fumed silica was contained in hopper 12 and was metered 14 into the up-stream stage of co-rotating, intermeshing double screw extruder (L/D=42) 16. Filler was added 14 (barrel 1) to extruder 16 and processing fluid 18 was added at 20 (barrel 1). The processing fluid was a combination of a silanol-stopped polydimethylsiloxane, a vinyl-stopped dimethyl-methylvinylsiloxane and a hydroxy-terminated polydimethyl-methylvinylsiloxane. Silicone polymer 22, 24 was added 26, 28 at equal rates at two locations (barrels 8 and 9). Air entrained in the fumed silica and surplus volatiles were eliminated through vents 30 and 32 (barrels 11 and 13).

The extruder 16 comprised a conveying stage 34 (barrel 1 through barrel 6), a kneading stage 36 (barrel 7 through barrel 10) for distributive and dispersive mixing, screw bushings 38 (barrel 11 through 13) for deairation, devolatilization and a discharge conveying stage 40 (barrel 14) for pressure generation. In this FIG. 1, the compounding screw elements of the stages are shown mounted along shafts 42, 44.

Silicone compositions were compounded with about 21 to 33 weight percent treated fumed silica, a vinylsilicone and a processing fluid solution prepared by mixing (in lbs) 1.21 parts of a silanol-stopped polydimethylsiloxane, 1.82 parts of a vinyl-stopped dimethyl-methylvinylsiloxane and 0.12 part of a hydroxy-terminated polydimethyl-methylvinylsiloxane.

The process was run at throughputs between 20 and 35 lb/hr using screw speeds between 350 and 500 rpm and barrel temperatures between 150° C. and 175° C. along the entire extruder. Temperature of the material at the exit of the extruder was measured at between 170° C. to about 210° C.

First, the procedure illustrated in FIG. 1 was conducted with atmospheric venting at both vents 30 and 32.

Samples of materials were cured with 2,4-dichlorobenzoyl peroxide and tested for mechanical properties. Physical properties of the samples were determined and are reported as runs 1001 to 1006 (Table 1). Low-amplitude oscillatory shear was used to evaluate the complex viscosity and storage modulus of the elastomers. Barrel temperature in run 1001 was set at 175° C. Recorded temperature at each barrel was about 175° C. Barrel temperature in runs 1002 to 1006 was set at 150° C. Recorded temperatures at succeeding barrels were 35, 166, 128, 161, 149, 148, 153, 197, 170 and 150° C.

TABLE 1

| Property/Sample | 1001 | 1002 | 1003 | 1004 | 1005 | 1006 |
|---|---|---|---|---|---|---|
| Treated Fumed Silica (Wt. %) | 21.4 (*) | 27.6 (*) | 32.7 (*) | 32.7 (*) | 32.7 (*) | 32.7(*) |
| Pretreated Fumed Silica (lb/hr) | 6.21 | 8.57 | 10.01 | 10.01 | 10.01 | 10.01 |
| Processing Fluid (lb/hr) | 0.8 | 0.74 | 0.87 | 0.87 | 0.87 | 0.87 |
| Torque (%) | 31 | 35 | 30 | 30 | 30 | 30 |
| Material Exit Temperature (C) |  | 177 | 172 |  |  |  |
| Screw Speed (rpm) | 425 | 425 | 500 | 500 | 500 | 500 |
| Vacuum (inches Hg) | Off | Off | Off | Off | Off | Off |
| Williams Plasticity |  | 237 | 374 | 324 | 321 | 324 |
| Shore A Hardness | 44.2 | 54.7 | 65 | 63.2 |  |  |
| Tensile Strength (psi) | 911 | 1292 | 1343 | 1419 | 1399 |  |
| Elongation (%) | 470 | 478 | 406 | 407 | 419 |  |
| 100% Modulus | 131 | 200 | 315 | 278 | 279 |  |
| Tear B (ppi) | 69 | 108 | 116 | 112 | 112 | 105 |

TABLE 1-continued

| Property/Sample | 1001 | 1002 | 1003 | 1004 | 1005 | 1006 |
|---|---|---|---|---|---|---|
| Specific Gravity | 1.108 | 1.15 | 1.185 | 1.176 | 1.173 | |
| Complex Viscosity (P) | 4598600 | 17936000 | 25942000 | | | |
| Storage Modulus (dyn/cm2) | 286590 | 1335200 | 1926100 | | | |

Table 1 shows that materials with acceptable physical properties can be obtained from treated fumed silica using a single-step process that involves no preconcentrating of filler and polymer components. For example, tensile strength is a measure of the reinforcing effect introduced by addition of fumed silica filler. Viscosity is important for subsequent roll-milling and extrusion steps wherein the filled silicone composition is cross-linked in the presence of a catalyst at high temperature. Runs 1004, 1005 and 1006 are examples of the same material tested three times.

EXAMPLE 2

The procedure illustrated in FIG. 1 was repeated except that a vacuum was applied at vent 32 (barrel 13) to facilitate elimination of residual volatiles (moisture, unpolymerized monomer and solvents). A pair of blister rings (barrel 12) was used in the screws to isolate vent 32 (barrel 13) where devolatilization of the silicone polymer composition was effectuated by the application of a vacuum that ranged from 685 mm to 736 mm Hg (27 to 29 inches Hg).

Operating conditions, feeds and physical properties of cured samples are shown in Table 2 (runs 1007 to 1009). Temperatures were set at 189° C. (first barrel), 150° C. (barrels 2 to 5) and 175° C. (barrels 6 to end). Recorded barrel temperatures at succeeding barrels for 1007 were 28, 153, 163, 144, 149, 175 172, 191, 189 and 175° C. and for 1008 were 29, 162, 154, 156, 152, 174, 175, 191, 194 and 174° C.

TABLE 2

| Property/Sample | 1007 | 1008 | 1009 |
|---|---|---|---|
| Treated Fumed Silica (Wt. %) | 21 (*) | 28.3 (*) | 29 (*) |
| Pretreated Fumed Silica (lb/hr) | 7.4 | 8.57 | 8.57 |
| Processing Fluid (lb/hr) | 0.96 | 0.74 | 0.74 |
| Torque (%) | 30 | 32 | 25 |
| Material Exit Temperature (C) | 210 | 202 | |
| Screw Speed (rpm) | 445 | 450 | 425 |
| Vacuum (inches Hg) | On (29") | Off | On (29") |
| Williams Plasticity | 190 | 278 | 282 |
| Specific Gravity | 1.105 | 1.155 | 1.16 |
| Residual Volatiles (%) | 0.69, 0.81 | 1.24, 1.67 | 0.84, 0.88 |
| Complex Viscosity (P) | 2787700 | 19761000 | 18294000 |
| Storage Modulus (dyn/cm2) | 169480 | 1519700 | 1419100 |

Runs 1007 to 1009 show that adequate levels of residual volatiles can be obtained when compositions are extruded using high levels of vacuum

EXAMPLE 3

FIG. 2 illustrates another embodiment of the invention. FIG. 2 illustrates a process and apparatus 40 wherein silicone compositions were prepared without using a filler-polymer concentrate or a pre-treated silica. In FIG. 2, raw fumed silica 45, HMDZ 46 and deionized water 47 were respectively added 48, 50, 52 (barrel 1) to co-rotating, intermeshing double screw extruder 54 (L/D=42) at a first location. Processing fluid, treating agents, flow promoters and reagents 56 for secondary treatment of the filler, were incorporated 58 (barrel 7) and a vinylsilicone polymer 60 was added 62 (barrels 8 and 9) at equal rates. The processing fluid solution was prepared by mixing (in lbs) 1.21 parts of a silanol-stopped polydimethylsiloxane, 1.82 parts of a vinyl-stopped dimethyl-methylvinylsiloxane and 0.12 part of a hydroxy-terminated polydimethyl-methylvinylsiloxane. Nitrogen 64 was added 66 at the base of the filler side-feeder hopper and at 68 (barrel 2) and at 70 (barrel 10) to provide an inert atmosphere. Air entrained in the fumed silica and residual volatiles were eliminated (barrels 11, 13) through atmospheric vent 72 and vacuum vent 74.

Operating conditions, feeds and physical properties of cured samples for this embodiment are shown in Table 3 for runs 1010 to 1014. In Table 3, weight-loss analysis was used to determine amount of volatiles that remained in the material after extrusion. Weight percent of fumed silica indicated (*) was approximated from specific gravity values. In runs 1010 to 1011, nitrogen was inserted at the base of the fumed silica side stuffer hopper. Nitrogen was also inserted at barrels 2 and 10 and in the hose of the vacuum line at barrel 13. Barrel temperature was set at 175° C. along the full length of the extruder for runs 1010 to 1011. Recorded barrel temperatures at succeeding barrels for 1010 were 24, 161, 126, 179, 175, 173, 173, 185, 188 and 177° C. and for 1011 were 25, 178, 141, 177, 174, 175, 180, 184, 185 and 177° C. A die plate adapter with ~2.25"×1.25" cross section was used in runs 1012 to 1014. Barrel temperature was set at 160° C. along the full length of each extruder for runs 1012 to 1014. Recorded barrel temperatures at succeeding barrels for 1012 were 49, 154, 160, 160, 164, 164, 162, 159, 160, 159 and 160° C., for 1013 were 47, 153, 160, 161, 158, 159, 155, 157, 157, 156 and 158° C. and for 1014 were 47, 155, 161, 160, 160, 159, 160, 160, 161, 160 and 161° C.

TABLE 3

| Property/Sample | 1010 | 1011 | 1012 | 1013 | 1014 |
|---|---|---|---|---|---|
| Raw Fumed Silica (lb/hr) | 6.6 | 6.33 | 6 | 6 | 6 |
| Silicone Polymer (lb/h) | 16.37 | 16.59 | 12 | 12 | 12 |
| HMDZ (lb/hr) | 0.33 | 0.33 | 0.66 | 0.66 | 0.33 |
| Water (lb/h) | 0.232 | 0.161 | 0.55 | 0.55 | 0.28 |
| Processing Fluid (lb/hr) | 0.657 | 0.657 | 1.1 | 0.55 | 1.1 |

TABLE 3-continued

| Property/Sample | 1010 | 1011 | 1012 | 1013 | 1014 |
|---|---|---|---|---|---|
| Torque (%) | 32 | 22 | 34 | 21 | 22 |
| Material Exit Temperature (C) | 188 | 180 | 204 | 200 | 202 |
| Screw Speed (rpm) | 400 | 450 | 350 | 350 | 375 |
| Vacuum (inches Hg) | Off | Off | On (15") | Off | Off |
| Filler Level (Wt %)(*) | 26.8 | 24.1 | 31.9 | 31.9 | 31.2 |
| Residual Volatiles (%) | | | 1.82 | 1.66 | 1.57 |
| Williams Plasticity | | | | | |
| Day 1 | 222 | 194 | 326 | 341 | 280 |
| Day 2 | 253 | 220 | 349 | 397 | 300 |
| Day 3 | 287 | 238 | 363 | 421 | 313 |
| Week 1 | 302 | 257 | 397 | 461 | 357 |
| Week 2 | 326 | 280 | 416 | 513 | 372 |
| Week 3 | 333 | 292 | 421 | 510 | 377 |
| Shore A Hardness | 59 | 54 | 68 | 65 | 64 |
| Tensile Strength (psi) | 1238 | 1046 | 1556 | 1606 | 1493 |
| Elongation (%) | 338 | 317 | 355 | 356 | 346 |
| 100% Modulus | 265 | 241 | 436 | 377 | 386 |
| Tear B (ppi) | 95 | 82 | 145 | 129 | 127 |
| Specific Gravity | 1.145 | 1.126 | 1.18 | 1.18 | 1.175 |
| Opticals | | | | | |
| Transparency | | | 81.5 | 79.4 | 81.5 |
| Haze | | | 19.3 | 21.6 | 21.2 |
| Yellowness Index | | | 15.985 | 18.298 | 15.709 |

Inadequate filler treatment can result in unacceptably high concentrations of free silanols on the surface of the filler, which results in strong hydrogen bonding interaction with the silicone polymer. Hydrogen bonding causes a rise in plasticity with time. Hence, plasticity rise with time is commonly used to evaluate the effectiveness of filler treatment. A one hundred and fifty-point rise in plasticity over a three-week period is considered acceptable for heat-vulcanizable silicone compositions of the tested polymer/filler ratio.

In Runs 1010 to 1014, a slight rise in Williams plasticity after 24 hours indicates that treatment of fumed silica filler using this process was adequate. The long-term plasticity rise observed after 3 weeks was comparable to that obtained in materials compounded in batch processes and pretreated silica processes. The silicone compositions of Runs 1010 to 1014 were characterized by varying polymer/filler/HMDZ/water/additives ratios. The runs 1010 to 1014 results establish that the invention process can be used to successfully compound heat-vulcanizable silicone compositions without using a filler-polymer concentrate or a pretreated filler.

EXAMPLE 4

FIG. 3 illustrates a process and apparatus similar to the process and apparatus of FIG. 2 except that extruder 82 comprised 10 barrels (L/D=30) compared to the 14 barrel extruders of FIGS. 1 and 2.

In FIG. 3, raw fumed silica 84, HMDZ 86 and water 88 were added respectively at 90, 92 and 94 to extruder 82 (barrel number 1). Processing fluids and treating agents 96 including flow promoters and reagents for secondary treatment of the filler, were incorporated at 98 (barrel 2). Silicone polymer 100 was added 102 at barrel 3. The processing fluid solution was prepared by mixing (in lbs) 1.21 parts of a silanol-stopped polydimethylsiloxane, 1.82 parts of a vinyl-stopped dimethyl-methylvinylsiloxane and 0.12 part of a hydroxy-terminated polydimethyl-methylvinylsiloxane in amounts indicated in the Tables.

The processing material was atmospherically vented at 104. Nitrogen 106 was added 108 at vacuum vent 110 (barrel 9) to dilute the gaseous mixture exiting the extruder through the vacuum vent 110 and to provide an inert atmosphere to prevent oxidative reactions between flammable HMDZ and air.

The extruder 82 was characterized by a conveying stage (barrel 1 through barrel 2), a kneading stage for distributive and dispersive mixing (barrel 3 through barrel 6), a conveying stage for deairation and devolatilization (barrel 7 through barrel 9) and exit conveying elements (barrel 10) for pressure generation. A pair of blister rings were used for sealing at barrel 8. The process was run at throughputs of about 15 lb/hr to 22 lb/hr using screw speeds between 400 and 500 rpm and a barrel temperature of about 165° C. along the entire extruder. Temperature of the material at the exit of the extruder was between about 190° C. and about 240° C.

Operating conditions, feeds and physical properties of cured samples for this embodiment are shown in Tables 4 and 5 for runs 1015 to 1026. In Tables 4 and 5, weight-loss analysis was used to determine amount of volatiles that remained in the material after extrusion. Weight percent of fumed silica indicated (*) was approximated from specific gravity values. Barrel temperature was set at 125° C. at a first barrel then 165° C. for the next 7 barrels for runs 1015 to 1026. Recorded barrel temperature ranged from about 160° C. to about 190° C. for all runs.

TABLE 4

| Property/Sample | 1015 | 1016 | 1017 | 1018 | 1019 | 1020 |
|---|---|---|---|---|---|---|
| Raw Fumed Silica (lb/hr) | 5 | 5 | 5.3 | 5.3 | 5.3 | 5.3 |
| Silicone Polymer (lb/hr) | 11.08 | 9.69 | 9.69 | 9.69 | 9.69 | 9.69 |
| HMDZ (lb/hr) | 0.5 | 0.5 | 0.5 | 0.54 | 0.54 | 0.54 |
| Water (lb/hr) | 0.35 | 0.35 | 0.35 | 0.5 | 0 | 0.5 |
| Processing Fluid (lb/hr) | 0.88 | 0.88 | 0.88 | 0.88 | 0.88 | 0.88 |
| Torque (%) | 30 | 28 | −30 | 36 | 41 | 36 |
| Material Exit Temperature (C) | 188 | 194 | 196 | 217 | 241 | 224 |
| Screw Speed (rpm) | 400 | 440 | 460 | 430 | 430 | 430 |
| Vacuum (inches Hg) | Off | Off | Off | On (29") | On (29") | On (29") |
| Filler Level (Wt %)(*) | 28.7 | 31.5 | 33.5 | 32.1 | 34 | 29.4 |
| Residual Volatiles (%) | 1.53 | 1.56 | 0.51 | | | |
| Willlams Plasticity | | | | | | |
| Day 1 | 245 | 294 | 346 | 317 | 564 | 291 |
| Day 2 | 277 | 333 | 459 | 373 | 614 | 364 |
| Day 3 | 333 | 344 | 472 | 414 | 600 | 420 |
| Week 1 | 288 | 354 | 495 | 554 | 612 | 430 |
| Week 2 | 292 | 363 | 513 | 478 | 600 | 449 |
| Week 3 | 290 | 340 | 524 | 480 | 602 | 494 |
| Shore A Hardness | 56 | 63 | 69 | 63 | 69 | 65 |
| Tensite Strangth (psi) | 1690 | 1695 | 1556 | 1515 | 1542 | 1453 |
| Elongation (%) | 500 | 495 | 340 | 296 | 248 | 259 |
| 100% Modulus | 211 | 235 | 451 | 465 | 659 | 518 |
| Tear B (ppi) | 109 | 125 | 135 | 109 | 97 | 103 |
| Specific Gravity | 1.158 | 1.177 | 1.191 | 1.181 | 1.194 | 1.163 |
| Opticals | | | | | | |
| Transparency | 79.4 | 78.7 | 80.8 | 73.2 | 70 | 71.6 |
| Haze | 30.5 | 27.5 | 24.8 | 46.3 | 27.6 | 37.9 |
| Yellowness Index | 15.992 | 15.481 | 14.2 | 19.724 | 24.413 | 20.715 |

TABLE 5

| Property/Sample | 1021 | 1022 | 1023 | 1024 | 1025 | 1026 |
|---|---|---|---|---|---|---|
| Raw Fumed Silica (lb/hr) | 5.3 | 5 | 5 | 5 | 5 | 3.5 |
| Silicone Polymer (lb/hr) | 9.69 | 9.69 | 9.69 | 9.69 | 9.69 | 9.69 |
| HMDZ (lb/hr) | 0.54 | 0.5 | 0.5 | 0.66 | 0.66 | 0.46 |
| Water (lb/hr) | 0.5 | 0.5 | 0.5 | 0.5 | 0.5 | 0.5 |
| Prcoessing Fluid (lb/hr) | 0.88 | 0.88 | 0.44 | 0.44 | 0.44 | 0.44 |
| Torque (%) | 36 | 36 | 35 | 35 | 32 | 33 |
| Material Exit Temperature (C) | 220 | 237 | 216 | | 216 | |
| Screw Speed (rpm) | 430 | 450 | 450 | 450 | 450 | 450 |
| Vecuum (inches Hg) | Off | On (29") | On (29") | On (29") | Off | On (29") |
| Filler Level (Wt % X°) | 28.7 | 32.8 | 30.3 | 30 | 30.8 | 322 |
| Williams Plastcity | | | | | | |
| Day 1 | 272 | 352 | 343 | 273 | 283 | 348 |
| Day 2 | 334 | 414 | 406 | 330 | 355 | 410 |
| Day 3 | 395 | 442 | 455 | 362 | 397 | 441 |
| Week 1 | 424 | 500 | 509 | 410 | 436 | 497 |
| Week 2 | 446 | 506 | 500 | 440 | 470 | 483 |
| Week 3 | 442 | 533 | 507 | 456 | 478 | 504 |
| Shore A Hardness | 62 | 67 | 64 | 59 | 61 | 63 |
| Tensile Strength (psi) | 1472 | 1382 | 1423 | 1285 | 1456 | 1482 |
| Elongation (%) | 292 | 234 | 269 | 242 | 292 | 251 |
| 100% Modulus | 448 | 575 | 459 | 449 | 379 | 428 |
| Tear B (ppi) | 116 | 109 | 101 | 112 | 104 | 111 |
| Specific Gravity | 1.158 | 1.186 | 1.169 | 1.167 | 1.172 | 1.182 |
| Opticals | | | | | | |
| Transparency | 80.6 | 752 | 61 | 79.9 | 80A | 78.3 |
| Haze | 27.1 | 31.6 | 25.5 | 24.6 | 26.5 | 30 |
| Yellowness Index | 15.13 | 19.44 | 14.453 | 16 | 14.766 | 16.184 |

Results for runs 1015 to 1026 according to this Example show that the process of FIG. 3 is adequate to treat and compound raw fumed silica filler in a single co-rotating, intermeshing double screw extruder. Additionally, the results show that the present process of compounding can be completed in a unitary extruder of a length that is comparable to extruders used in processes that require multiple compounding or mixing apparatus. The silicone compositions whose properties are shown in Table 4 and Table 5 had different polymer/filler/HMDZ/water/additives ratios. The rise in Williams plasticity observed in these samples was similar to that in samples prepared using the longer extruder depicted in FIG. 2. The modest rise in plasticity values over time establishes that silica can be successfully treated and incorporated into a silicone polymer of high molecular weight by the shorter processing extruder length of the present invention.

The compounding steps of the Examples were conducted in co-rotating, intermeshing double screw extruders having screws that comprised right-handed and neutral kneading blocks. Left-handed kneading blocks may be unsuitable because they generate large amounts of heat. A left-handed kneading block is postured in direct opposition to the flow of material within an extruder. It is believed that the left-handed blocks generate back pressure that increases residence time of processing materials in a region located just up-stream of the individual blocks. The increased residence time allows incorporation of large amounts of frictional heat into the processing materials. The neutral kneading blocks can be utilized to generate moderate back pressure where advantageous to the process. For example, the neutral kneading blocks are advantageous in the extruder mixing section, where filler is incorporated into the silicone polymer or up-stream of a vacuum port where material is pushed against the extruder wall to generate a seal for devolatilization.

Deep flighted, undercut conveying elements are preferred elements of the feed stage of the extruder of the invention. The elements should have an outside diameter (OD) to inside diameter (ID) ratio of between 1.2 to 2.4. Desirably the OD/ID ratio is between about 1.4 to about 2.1 and preferably between about 1.6 and about 1.9. Deep flighted undercut conveying elements form large volume spacings to maximize addition of filler into the extruder. Compression of filler by the deep flighted screws in up-stream stages of the process rapidly eliminates air entrained in the filler thereby permitting the filler to be fed into the extruder at a higher rate.

Blister rings (sometimes called backup disks) can be used in the compounding apparatus of the invention to generate pressure without excessively raising material temperature. The rings can be placed up-stream of a vacuum vent to seal the venting zone to permit application of vacuum so that low molecular weight components can be stripped from the processing material.

While embodiments of the invention have been described, the present invention is capable of variation and modification and therefore should not be limited to the precise details of the Examples. For example in another embodiment of the invention, a process can be conducted in a set-up that utilizes both a co-rotating, intermeshing double screw extruder similar to that used in the one-extruder processes shown in FIG. 1, FIG. 2 and FIG. 3, and a second extruder of different characteristics. The extruders can be mounted in closely coupled series. Material from an up-stream extruder can be force-fed directly to a down-stream extruder by means of the screw rotation pressure generated internally in the first extruder. This set-up can include an arrangement wherein the up-stream extruder is a side feeder where filler is added, wetted by additives and treating agents, partially treated and dispersed into some or all of the silicone polymer. The down-stream extruder can be utilized for filler dispersion, treatment, compounding and devolatilization. This combination can provide improved feeding capability, residence time, mixing intensity, kinetics and devolatilization efficiency and temperature control. As with a single extruder process, the combined process does not require the use of filler-polymer preconcentrate. The fumed silica filler can be treated within the extruders or in a previous step.

Counter-rotating, non-intermeshing, single-screw reciprocating and non-reciprocating and co-rotating, self-wiping extruders are examples of continuous apparatus that can be used in combination with the co-rotating, intermeshing double screw extruder of the invention to provide a multiple extruder process for the compounding of heat-vulcanizable silicone compositions according to the invention.

The invention includes changes and alterations that fall within the purview of the following claims.

What is claimed is:

1. A process for compounding a filled silicone composition, comprising:
    mixing a filler with a processing fluid at a first location of a unitary continuous compounding apparatus to form a mixture of filler and processing fluid prior to addition of a silicone polymer, and
    mixing said mixture of filler and processing fluid with said silicone polymer at a location downstream from said first location in said unitary continuous compounding apparatus, wherein said processing fluid is different than said silicone polymer.

2. The process of claim 1, wherein said processing fluid is a silanol-reacting treating agent.

3. The process of claim 1, wherein said processing fluid is selected from the group consisting of silanol-stopped polydimethylsiloxane, vinyl-stopped dimethyl-methylvinylsiloxane and hydroxy-terminated polydimethyl-methylvinylsiloxane.

4. The process of claim 1, wherein said filler is a fumed silica.

5. The process of claim 1, wherein said silicone polymer is a polydiorganosiloxane.

6. The process of claim 1, wherein said silicone composition is a heat-vulcanizable silicone polymer rubber composition.

7. The process of claim 1, wherein said mixing of filler and processing fluid is conducted in a conveying stage of said compounding apparatus prior to said mixing of said filler with said silicone polymer.

8. The process of claim 1, wherein said filler is combined with said silicone polymer in a range of from about 5 to about 200 parts filler per 100 parts by weight of polymer.

9. The process of claim 1, wherein said filler is combined with said silicone polymer in a range of from about 10 to about 100 parts filler per 100 parts by weight of polymer.

10. The process of claim 1, wherein said processing fluid is combined with said filler in a range of from about 0.1 to about 100 parts fluid per 100 parts by weight of filler.

11. The process of claim 1, wherein said processing fluid is combined with said filler in a range of from about 0.5 to about 75 parts fluid per 100 parts by weight of filler.

12. The process of claim 1, wherein said filler is raw, untreated silica.

13. A process for compounding a filled silicone composition, comprising:
    mixing a filler with a processing fluid at a first location of a unitary continuous compounding apparatus prior to addition of a silicone polymer, and
    mixing said filler with said silicone polymer at a location downstream from said first location in said unitary continuous compounding apparatus, wherein said unitary compounding apparatus is a co-rotating, intermeshing double screw extruder.

14. The process of claim 13, wherein said filler contains silanol groups and is pretreated with a silanol-reacting treating agent prior to introduction into said compounding apparatus.

15. The process of claim 13, wherein said filler contains silanol groups and said processing fluid is a treating agent comprising silanol-stopped polydimethylsiloxane, octamethylcyclotetrasiloxane (D4) or hexamethyldisilazane (HMDZ).

16. The process of claim 13 wherein said filler contains silanol groups, comprising reacting said silanol-reacting treating agent with silanol groups in said filler to reduce available groups to a concentration of between about 8 to about 2 hydroxyl groups/(nanometer)$^2$ of filler.

17. The process of claim 13 wherein said filler contains silanol groups, comprising reacting said silanol reacting treating agent with silanol groups in the filler to reduce available groups to a concentration of between about 5 to about 3 hydroxyl groups/(nanometer)$^2$ of filler.

18. The process of claim 13, wherein said filler is a fumed silica and said fumed silica is force-fed under pressure into said first location.

19. The process of claim 13, wherein said compounding is completed in a compounding apparatus of at least some length that is about 42 diameters or less in length.

20. The process of claim 13, wherein said compounding is completed in a compounding apparatus of at least some length that is about 30 diameters or less in length.

21. The process of claim 13, wherein said compounding apparatus is an extruder operated at a screw speed between about 100 rpm and about 1000 rpm.

22. The process of claim 13, wherein said compounding apparatus is an extruder operated at a screw speed between about 200 rpm and about 800 rpm.

23. The process of claim 13, wherein said compounding apparatus is an extruder operated at a screw speed between about 280 rpm and about 450 rpm.

24. The process of claim 13, wherein said compounding apparatus is an extruder operated at a ratio of throughput (lb/hr) to screw speed (rpm) of between about 0.01 and about 100.

25. The process of claim 13, wherein said compounding apparatus is an extruder operated at a ratio of throughput (lb/hr) to screw speed (rpm) of between about 0.1 and about 70.

26. The process of claim 13, wherein said compounding apparatus is an extruder operated at a ratio of throughput (lb/hr) to screw speed (rpm) of between about 0.5 and about 50.

27. The process of claim 13, comprising controlling said process to provide a total throughput to screw speed ratio between about 0.5 and about 50 (lb/hour/rpm).

28. The process of claim 13, comprising conducting said process in a compounding apparatus comprising at least one filler addition port and at least one vacuum port associated with said filler addition port.

29. The process of claim 13, comprising venting volatiles from said filled silicone composition to a level less than about 2% by weight of the silicone composition.

30. The process of claim 13, comprising venting volatiles from said filled silicone composition to a level less than about 1% by weight of the silicone composition.

31. The process of claim 13, comprising conducting said process in a compounding apparatus comprising at least one venting zone having a vacuum venting port.

32. The process of claim 31, comprising controlling pressure at said venting zone in mm of Hg between about 10 and about 300.

33. The process of claim 31, comprising controlling pressure at said venting zone in mm of Hg between about 20 and about 100.

34. The process of claim 31, comprising controlling pressure at said venting zone in mm of Hg between about 30 and about 80.

35. The process of claim 13, comprising conducting said process in a compounding apparatus comprising a barrel wherein barrel temperature is controlled between about 100° C. and about 200° C.

36. The process of claim 13, comprising conducting said process in a compounding apparatus comprising a barrel wherein barrel temperature is controlled at between about 130° C. and about 190° C.

37. The process of claim 13, comprising conducting said process in a compounding apparatus comprising a barrel wherein barrel temperature is controlled at between about 160° C. and about 180° C.

38. The process of claim 13, wherein said filler is fed into said unitary continuous compounding apparatus prior to mixing with said processing fluid.

39. The process of claim 13, wherein said filler is fed into said unitary continuous compounding apparatus at a plurality of feed ports for mixing with said processing fluid.

40. The process of claim 13, wherein said filler is combined with said silicone polymer in a range of from about 20 to about 60 parts filler per 100 parts by weight of polymer.

41. The process of claim 13, wherein said filler is a surface-treated silica combined with said silicone polymer in a range of from about 20 to about 60 parts filler per 100 parts by weight of polymer.

42. The process of claim 13, wherein said processing fluid is combined with said filler in a range of from about 1.0 to about 50 parts fluid per 100 parts by weight of filler.

43. The process of claim 13, wherein said processing fluid is added at a plurality of locations for mixing with said filler.

44. The process of claim 13, wherein said processing fluid comprises a treating agent and water.

45. The process of claim 13, wherein said filler is silica and said processing fluid comprises a treating agent and water in a weight ratio of treating agent to 100 parts silica of between about 0.1 and about 100 and a weight ratio of water to 100 parts silica of between about 0.1 and about 100.

46. The process of claim 13, wherein said filler is silica and said processing fluid comprises a treating agent and water in a weight ratio of treating agent to 100 parts silica of between about 0.5 and about 50 and a weight ratio of water to 100 parts silica of between about 0.5 and about 20.

47. The process of claim 13, wherein said filler is silica and said processing fluid comprises a treating agent and water in a weight ratio of treating agent to 100 parts silica of between about 1.0 and about 20 and a weight ratio of water to 100 parts silica of between about 1.0 and about 10.

48. The process of claim 13, wherein said filler is silica and said processing fluid comprises a treating agent and water in a weight ratio of treating agent/water of between about 0.05 to about 50.

49. The process of claim 13, wherein said filler is silica and said processing fluid comprises a treating agent and water in a weight ratio of treating agent/water of between about 0.1 and about 20.

50. The process of claim 13, wherein said filler is silica and said processing fluid comprises a treating agent and water in a weight ratio of treating agent/water of between about 1 and about 6.

51. The process of claim 13, wherein said filler is silica and said processing fluid comprises HMDZ and water.

52. The process of claim 13, wherein said filler is silica and said processing fluid comprises an amount of HMDZ of about 0.1 parts to about 100 parts by weight to about 100 parts silica and an amount of water of about 0.1 to about 100 parts by weight to 100 parts silica.

53. The process of claim 13, wherein said filler is silica and said processing fluid comprises an amount of HMDZ of about 0.5 parts to about 50 parts by weight to about 100 parts silica and an amount of water of about 0.5 to about 20 parts by weight to 100 parts silica.

54. The process of claim 13, wherein said filler is silica and said processing fluid comprises an amount of HMDZ of about 1.0 parts to about 20 parts by weight to about 100 parts silica and an amount of water of about 1.0 to about 10 parts by weight silica.

55. The process of claim 13, additionally comprising injecting an inert gas into said compounding extruder to suppress oxidative reaction between a flammable processing fluid and air.

56. The process of claim 13, additionally comprising injecting an amount of inert gas in the range of from about 20 to about 800 parts by weight per 100 parts of filler, into said compounding extruder to suppress oxidative reaction between a flammable processing fluid and air.

57. The process of claim 13, additionally comprising injecting an amount of inert gas in the range of from about 50 to about 600 parts by weight per 100 parts of filler, into said compounding extruder to suppress oxidative reaction between a flammable processing fluid and air.

58. The process of claim 13, additionally comprising injecting an amount of inert gas in the range of from about 100 to about 400 parts by weight per 100 parts of filler, into said compounding extruder to suppress oxidative reaction between a flammable processing fluid and air.

59. The process of claim 13, wherein said unitary continuous compounding apparatus comprises a counter-rotating, non-intermeshing double screw extruder.

60. The process of claim 13, wherein said unitary continuous compounding apparatus comprises a single screw reciprocating extruder.

61. The process of claim 13, wherein said unitary continuous compounding apparatus comprises a single screw non-reciprocating extruder.

62. The process of claim 1, wherein said silicone polymer is represented by recurring units of Formula I:

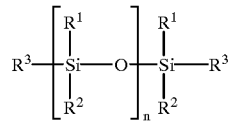

Formula I wherein $R^1$ independently at each occurrence represents $C_{1-4}$ alkyl, or $C_{2-4}$ alkenyl; $R^2$ independently at each occurrence represents $C_{1-4}$ alkyl, $C_1$–$C_4$ haloalkyl or $C_{2-4}$ alkenyl; $R^3$ independently at each occurrence is selected from the group consisting of H, $CH_2$=CH, and $OR^4$ wherein $R^4$ is selected from the group consisting of H, $CH_2$=CH, $C_{1-10}$ alkyl, $C_{2-4}$ alkenyl, $C_{4-6}$ cycloalkyl, and $C_1$–$C_4$ haloalkyl radical; and n represents an integer from 100 to 20,000.

63. The process of claim 62, wherein $R^1$ independently at each occurrence represents, $CH_3$ or CH=$CH_2$; $R^2$ independently at each occurrence represents, $CH_3$, CH=$CH_2$ or $CH_2CH_2CF_3$; $R^3$ independently at each occurrence represents $CH_3O$, CH=CHO, OH or $CF_3CH_2CH$—O; and n represents an integer from about 4,000 to about 10,000.

64. The process of claim 1, wherein said processing fluid excludes silicone polymers of a molecular weight greater than about 7000.

65. The process of claim 1, herein said unitary continuous compounding apparatus comprises a co-rotating, intermeshing double screw extruder.

* * * * *